(12) United States Patent
Kim

(10) Patent No.: US 6,865,004 B2
(45) Date of Patent: Mar. 8, 2005

(54) OPTICAL SCANNING APPARATUS

(75) Inventor: Hyung-soo Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/601,759

(22) Filed: Jun. 24, 2003

(65) Prior Publication Data

US 2004/0057099 A1 Mar. 25, 2004

(30) Foreign Application Priority Data

Jun. 29, 2002 (KR) ................................ 10-2002-0037518

(51) Int. Cl.$^7$ ............................................. G02B 26/08
(52) U.S. Cl. ..................................................... 359/205
(58) Field of Search ................................ 359/208, 204, 359/205, 206, 207, 212, 216, 217, 218, 219; 347/232

(56) References Cited

U.S. PATENT DOCUMENTS 6,504,639 B1 * 1/2003 Yoshikawa et al. ......... 359/208

FOREIGN PATENT DOCUMENTS

JP 2002-40345 2/2002

* cited by examiner

*Primary Examiner*—Euncha P. Cherry
(74) *Attorney, Agent, or Firm*—Staas & Halsey LLP (57) ABSTRACT

An optical scanning apparatus including a light source, a light deflector having a plurality of deflection surfaces to deflect a light beam emitted from the light source, and an image forming optical system to form an image on a target surface with a light beam deflected by the light deflector and reflect the light beam emitted from the light source using a deflection surface of the light deflector to scan the target surface. The optical scanning apparatus includes a mirror member, which has different refractivities in a main scan direction and a sub scan direction so that the mirror member reflects the light beam emitted from the light source to form a long linear image on the deflection surface in the main scan direction.

20 Claims, 6 Drawing Sheets

OPTICAL SCANNING APPARATUS

CROSS-REFERENCE TO RELATED APPLICATIONS

This application claims the priority of Korean Patent Application No. 2002-37518, filed Jun. 29, 2002, in the Korean Intellectual Property Office, the disclosure of which is incorporated herein by reference.

BACKGROUND OF THE INVENTION

1. Field of the Invention

The present invention relates to an optical scanning apparatus, and more particularly, to an optical scanning apparatus capable of preventing image print quality from being degraded due to a change in temperature therewithin.

2. Description of the Related Art

Generally, an optical scanning apparatus, such as a laser scanning unit (LSU), is applied to an image recording apparatus, such as a copy machine, printer, or facsimile, which prints an image on printing paper. The optical scanning apparatus scans a photoreceptor medium of an image forming apparatus with a light beam emitted from a light source, such as a laser diode, to form an electrostatic latent image.

Figure 1:
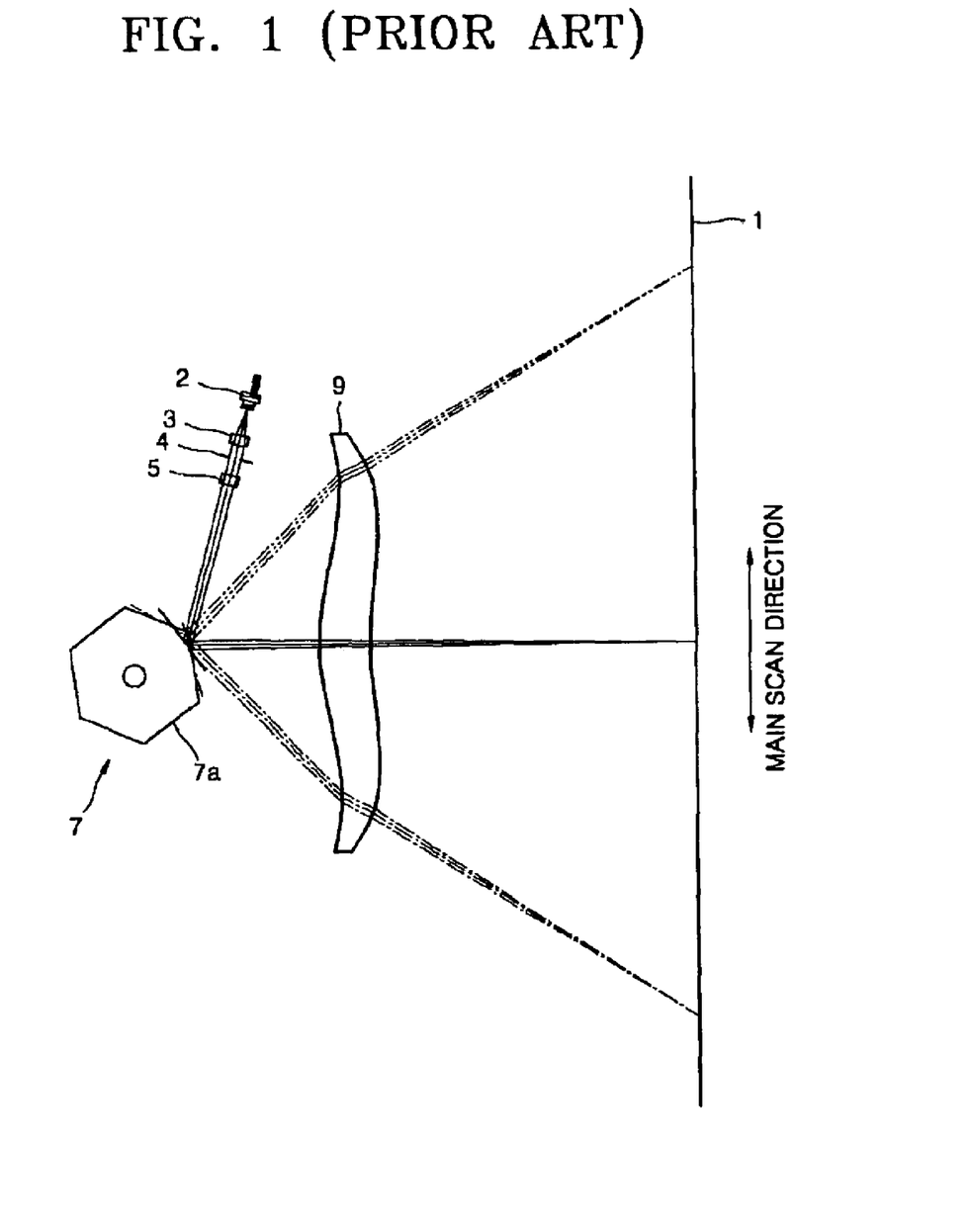
FIG. 1 is a diagram of a conventional optical scanning apparatus.

FIG. 1 is a diagram of a conventional optical scanning apparatus. Referring to FIG. 1, the conventional optical scanning apparatus includes a semiconductor laser 2, a collimating lens 3 to convert a laser beam diverging from the semiconductor laser 2 into a converging laser beam, a cylindrical lens 5 having a predetermined refractivity only in a sub scan direction, a light deflector 7 to deflect a light beam, an f-θ lens 9 disposed between the light deflector 7 and a target surface 1, i.e., a photoreceptor drum. Reference numeral 4 denotes an aperture iris to adjust the diameter of the laser beam passing therethrough.

Since the cylindrical lens 5 has the predetermined refractivity only in the sub scan direction, it makes a laser beam passing through the aperture iris 4 eventually form a linear image on a deflection surface 7a of the light deflector 7 in a main scan direction.

The light deflector 7 is rotated by a driving unit, such as a motor, at a predetermined speed during an image formation operation. The light deflector 7 may be a polygon mirror having a plurality of reflective surfaces used as the deflection surface 7a.

The f-θ lens 9 corresponds to an image forming optical system and is displaced from the center between the light deflector 7 and the target surface 1 to be closer to the light deflector 7. The f-θ lens 9 has different refractivities in the main and sub scan directions and guides a laser beam deflected and reflected by the deflection surface 7a of the light deflector 7 to the target surface 1.

In a conventional optical scanning apparatus having the above-described structure, the light deflector 7 is rotated so that the target surface 1 is scanned with a light beam in a main scan direction, thereby recording an image on the target surface 1.

With the recent high performance, small size, and low cost of image recording apparatuses, such as laser printers, laser facsimiles, and digital copy machines, optical components have been made of a plastic material. It is difficult to simultaneously satisfy these recent trends and realize satisfactory image print quality using the conventional optical scanning apparatus. In a case where the cylindrical lens 5 is made of a plastic material, when the internal temperature of the optical scanning apparatus increases due to the operation of a driving unit within the optical scanning apparatus and the operation of the image recording apparatus, the refractive index or shape of the cylindrical lens 5 changes due to the expansion of the material of the cylindrical lens 5. Consequently, the diameter of a beam on the photoreceptor medium increases, or the position of the beam on the photoreceptor medium changes, so that image print quality is degraded.

It is possible to manufacture the cylindrical lens 5 using a material having a small change in the refractive index and a small coefficient of expansion. However, this material is expensive, thereby increasing the manufacturing costs, so it is difficult to satisfy the requirement of low cost.

Furthermore, in the conventional optical scanning apparatus, an optical path between the semiconductor laser 2 and the light deflector 7 is on a straight line. Accordingly, the freedom in designing an apparatus and disposing components is restricted.

Moreover, in the conventional optical scanning apparatus, a laser beam emitted from the semiconductor laser 2 must be incident on the deflection surface 7a of the light deflector 7 at a large angle in order to secure a space for assembling or adjusting components. Thus, many factors may degrade image print quality. For example, there may be a difference in the quantity of light between the center and ends of an image due to differences in reflectance of the deflection surface 7a, or an effective area of the deflection surface 7a may increase.

SUMMARY OF THE INVENTION

Accordingly, it is an aspect of the present invention to provide an optical scanning apparatus in which image print quality is not degraded even though an internal temperature increases when optical components are made of a plastic material and in which a greater amount of freedom in designing the incident angle of light emitted from a light source and entering a deflection surface of a light deflector is possible.

Additional aspects and/or advantages of the invention will be set forth in part in the description which follows and, in part, will be obvious from the description, or may be learned by practice of the invention.

The foregoing and/or other aspects of the present invention may be achieved by providing an optical scanning apparatus including a light source; a light deflector having a plurality of deflection surfaces to deflect a light beam emitted from the light source; an image forming optical system to form an image on a target surface with a light beam deflected by the light deflector and including a deflection surface to reflect the light beam emitted from the light source to thereby scan the target surface; and a mirror member having different refractivities in a main scan direction and a sub scan direction so that the mirror member reflects the light beam emitted from the light source to form a linear image on the deflection surface which is relatively long in the main scan direction.

The mirror member may convergently reflect a light beam incident from the light source in the sub scan direction. The mirror member may be a cylindrical mirror having a plane in the main scan direction and a spherical or an aspherical surface in the sub scan direction.

The incident angle of the light beam emitted from the light source and entering the deflection surface of the light deflector can be changed in the main scan direction using the mirror member.

The optical scanning apparatus further includes a lens, which condenses the light beam divergently emitted from the light source and converts the light beam into a converging or parallel light beam, between the light source and the mirror member.

The image forming optical system may include an f-θ lens, which guides the light beam deflected and reflected by the deflection surface of the light deflector with different refractivities in the main and sub scan directions to form the image on the target surface.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
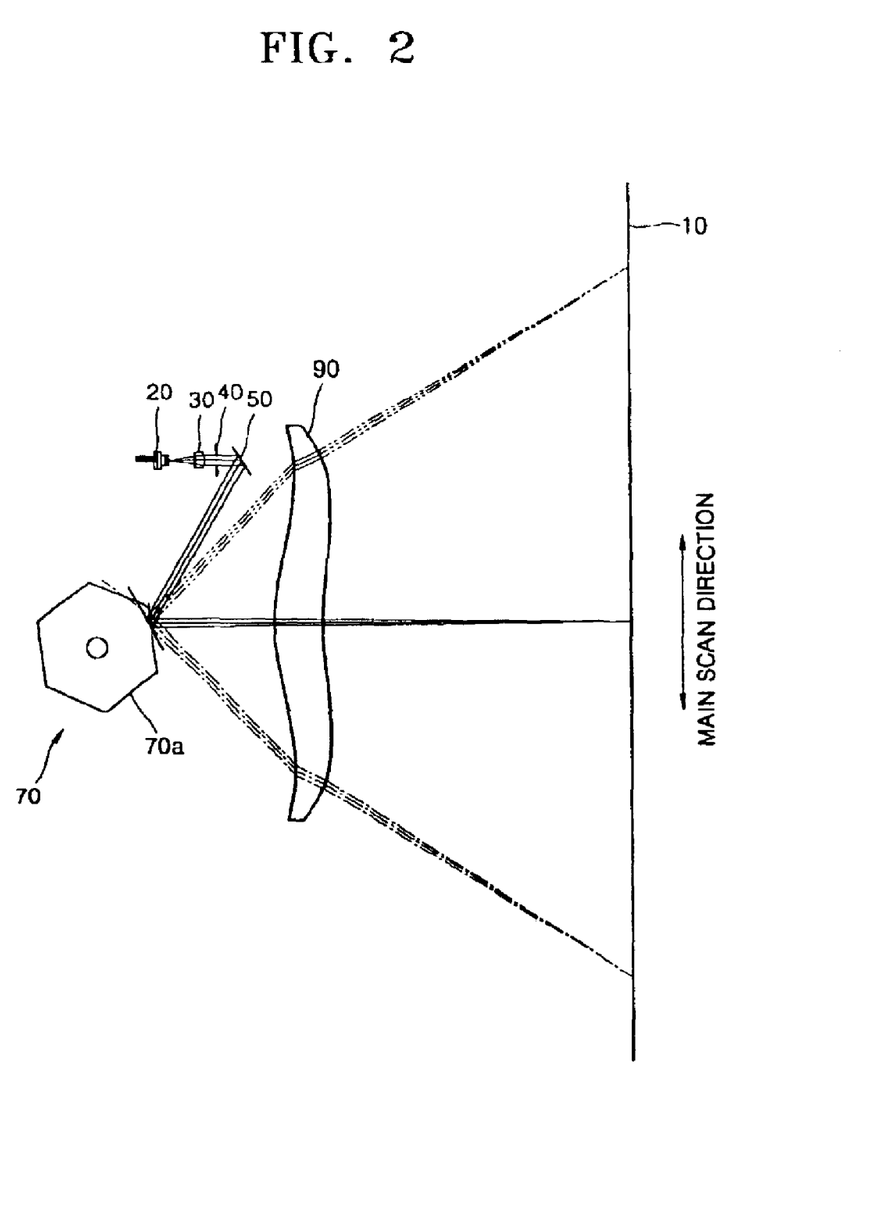
FIG. 2 is a diagram of a first embodiment of the optical arrangement of an optical scanning apparatus according to the present invention.

FIG. 2 is a schematic diagram of an optical scanning apparatus according to a first embodiment of the present invention. Referring to FIG. 2, the optical scanning apparatus includes a light source 20; a light deflector 70 having a plurality of deflection surfaces 70a to deflect a light beam emitted from the light source 20; and an image forming optical system forming an image on a target surface 10, i.e., an image forming surface of a photoreceptor medium of an image recording apparatus, by guiding a light beam deflected by the light deflector 70. The apparatus further includes a mirror member 50 to reflect a light beam emitted from the light source 20 so that a long linear image is formed on the deflection surface 70a in a main scan direction.

In addition, the optical scanning apparatus may include a collimating lens 30, which converts a diverging light beam emitted from the light source 20 into a converging or parallel light beam, between the light source 20 and the mirror member 50. The optical scanning apparatus may also include an aperture iris 40, which restricts the diameter of a light beam incident from the light source 20.

A single light source having a single emitting point or a plurality of emitting points, or a plurality of light sources, may be used as the light source 20. For example, a semiconductor laser emitting a laser beam can be used as the light source 20.

The light deflector 70 is rotated by a driving unit such as a motor at a predetermined speed in a single direction during an image formation operation and has a plurality of the deflection surfaces 70a. The light deflector 70 can be a polygon mirror having a plurality of reflective surfaces as the deflection surfaces 70a to deflect and reflect an incident light beam, as shown in FIG. 2.

The image forming optical system includes an f-θ lens 90 to guide a light beam deflected by the deflection surface 70a of the deflector 70 to the target surface 10, i.e., the image forming surface of the photoreceptor medium, thereby forming an image. The optical scanning apparatus according to the embodiment of the present invention shown in FIG. 2 includes only the f-θ lens 90 including a single lens as the image forming optical system. However, this is only an example, and various changes can be made to the structure of the image forming optical system.

The f-θ lens 90 is displaced from the center between the light deflector 70 and the target surface 10, to be closer to the light deflector 70. The f-θ lens 90 has different refractivities for a light beam deflected by the deflection surface 70a of the light deflector 70 in the main and sub scan directions.

Figure 3:
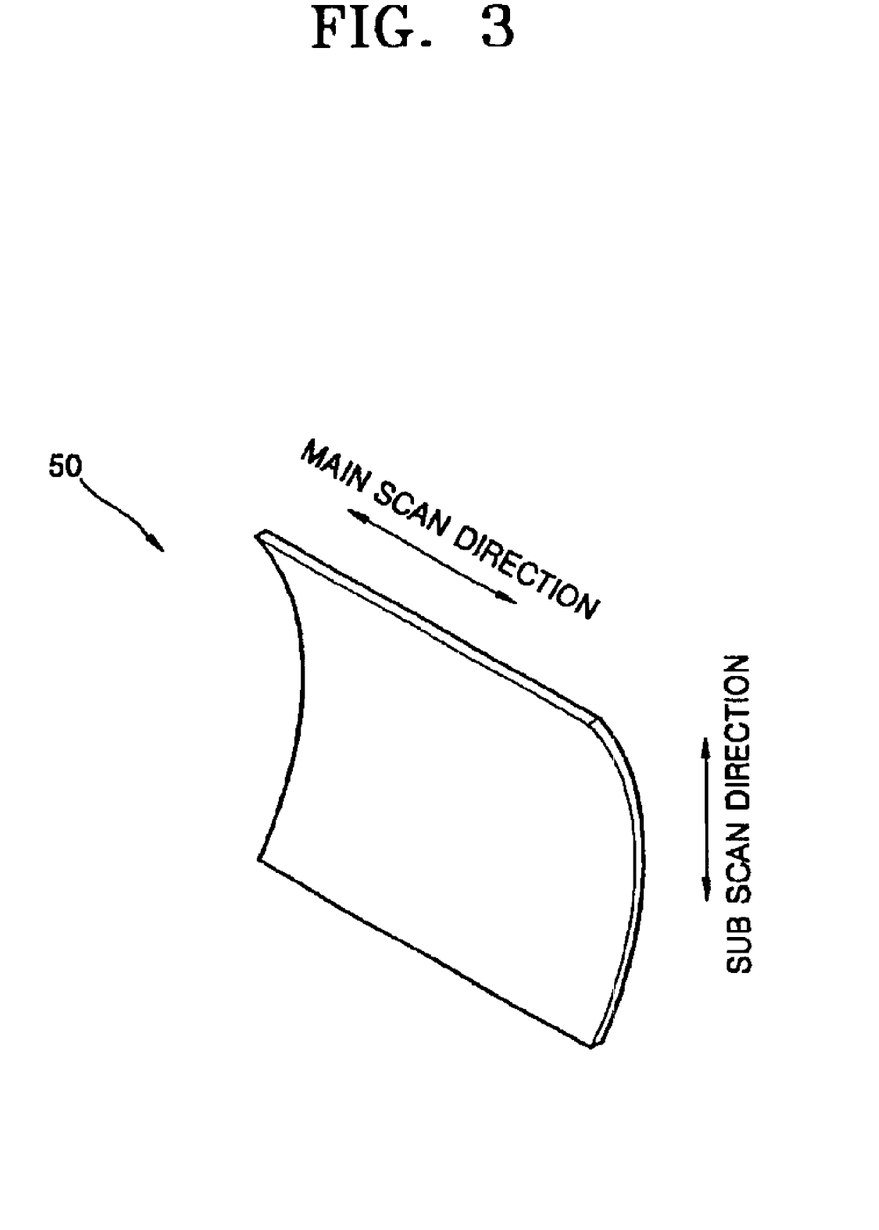
FIG. 3 is a perspective view of a mirror member shown in FIG. 2.

Since the mirror member 50 has different refractivities in the main and sub scan directions, it reflects a light beam incident from the light source 20 such that a long linear image is formed on the deflection surface 70a of the light deflector 70. For example, the mirror member 50 can be provided to reflect a light beam in the main scan direction without changing the dimensions thereof and convergently reflect the light beam in the sub scan direction so that a long linear image in the main scan direction can be formed on the deflection surface 70a of the light deflector 70. As shown in FIG. 3, the mirror member 50 may be a cylindrical mirror having a plane in the main scan direction and a spherical or an aspherical surface with a positive power in the sub scan direction.

The above-described mirror member 50 is not optically influenced by a change in the refractive index of its material and the expansion coefficient of its material when the internal temperature of the optical scanning apparatus increases. It is well known in the field of optics that since a mirror immediately reflects an incident light beam at its reflective coating surface, a mirror is not influenced by a change in the refractive index of its material and the expansion coefficient of its material due to an increase in temperature.

The above-described optical scanning apparatus scans the target surface 10 with a light beam emitted from the light source 20 in the main scan direction as follows. A light beam emitted from the light source 20 is converted into a converging or parallel light beam by the collimating lens 30, then restricted in size by the aperture iris 40, and then incident on the mirror member 50. The light beam incident on the mirror member 50 is, for example, reflected in the main scan direction without converging/diverging and is convergently reflected in the sub scan direction, thereby forming a linear image which is relatively long in the main scan direction on the deflection surface 70a of the light deflector 70, for example, a reflective surface of a polygon mirror. Then, the light beam is deflected by the deflection surface 70a of the rotating light deflector 70 (for example, a reflective surface of a polygon mirror) and is then guided to the target surface 10 by the f-θ lens 90 having different refractivities in the main and sub scan directions. Accordingly, when the optical scanning apparatus of the first embodiment of the present invention is applied to an image recording apparatus, it forms an electrostatic latent image on a photoreceptor medium, such as a photoreceptor drum, to perform image recording.

Unlike a conventional optical scanning apparatus including the cylindrical lens 5 which is greatly influenced by temperature, the optical scanning apparatus according to the first embodiment of the present invention includes the mirror member 50, which is not as greatly influenced by temperature, so degradation of performance due to an increase in temperature can be prevented even though the internal temperature of the optical scanning apparatus increases due to the operation of a driving unit within the optical scanning apparatus or the operation of an image recording apparatus. In addition, since the optical scanning apparatus according to the first embodiment of the present invention is not influenced by a change in the refractive index of a material and the expansion coefficient of the material at all, a cheap material such as plastic can be used, and costs for materials and manufacturing can be reduced.

In addition, since the above-described optical scanning apparatus of the first embodiment of the present invention includes the mirror member 50, it is easy to change an optical path between the light source 20 and the light deflector 70, as described below, so the design freedom in disposing the components of the optical scanning apparatus increases. Consequently, the design freedom increases.

Figure 4:
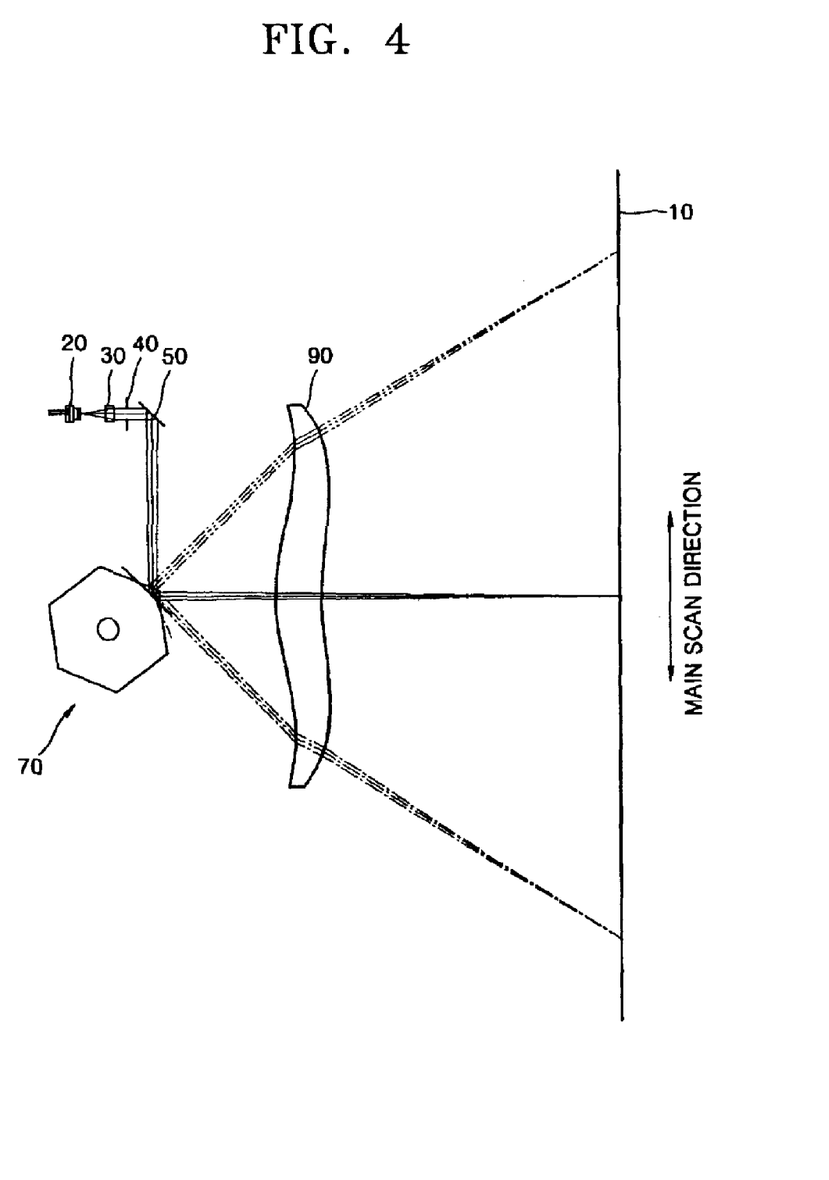
FIG. 4 is a diagram of a second embodiment of the optical arrangement of an optical scanning apparatus according to the present invention.

FIG. 2 shows a first embodiment of the optical arrangement of the optical scanning apparatus according to the present invention. FIG. 2 shows optical components from the light source 20 to the light deflector 70 in the optical scanning apparatus disposed to achieve a smaller incident angle of a light beam entering the light deflector 70 than in the conventional optical scanning apparatus. FIG. 4 shows a second embodiment of the optical arrangement of an optical scanning apparatus according to the present invention. FIG. 4 shows an example of disposing optical components from the light source 20 to the light deflector 70 in the optical scanning apparatus to achieve a larger incident angle of a light beam entering the light deflector 70 than in the conventional optical scanning apparatus.

By comparison between the conventional optical scanning apparatus shown in FIG. 1 and the first and second embodiments of the present invention shown in FIGS. 2 and 4, it can be inferred that it is possible to dispose the optical components from the light source 20 to the light deflector 70 such that the incident angle of a light beam entering the light deflector 70 is smaller or larger than in the conventional optical scanning apparatus, without changing the optical path of a scanning part in the optical scanning apparatus of the embodiments of the present invention. In other words, by using the mirror member 50 in an optical scanning apparatus, an incident angle, at which light emitted from the light source 20 is incident on the deflection surface 70a of the light deflector 70 in the main scan direction, can be varied within a wide range.

In the arrangement of the conventional optical scanning apparatus shown in FIG. 1, the incident angle of a light beam entering the light deflector 70 is about 75 degrees. In the arrangement of FIG. 2, the incident angle of a light beam entering the light deflector 70 is about 60 degrees. In the arrangement shown in FIG. 4, the incident angle of a light beam entering the light deflector 70 is about 90 degrees.

According to an optical scanning apparatus of the present invention, even though the incident angle of light emitted from the light source 20 and entering the deflection surface 70a of the light deflector 70 is changed by the mirror member 50 in the main scan direction, image forming performance is basically unaffected.

Figure 5:
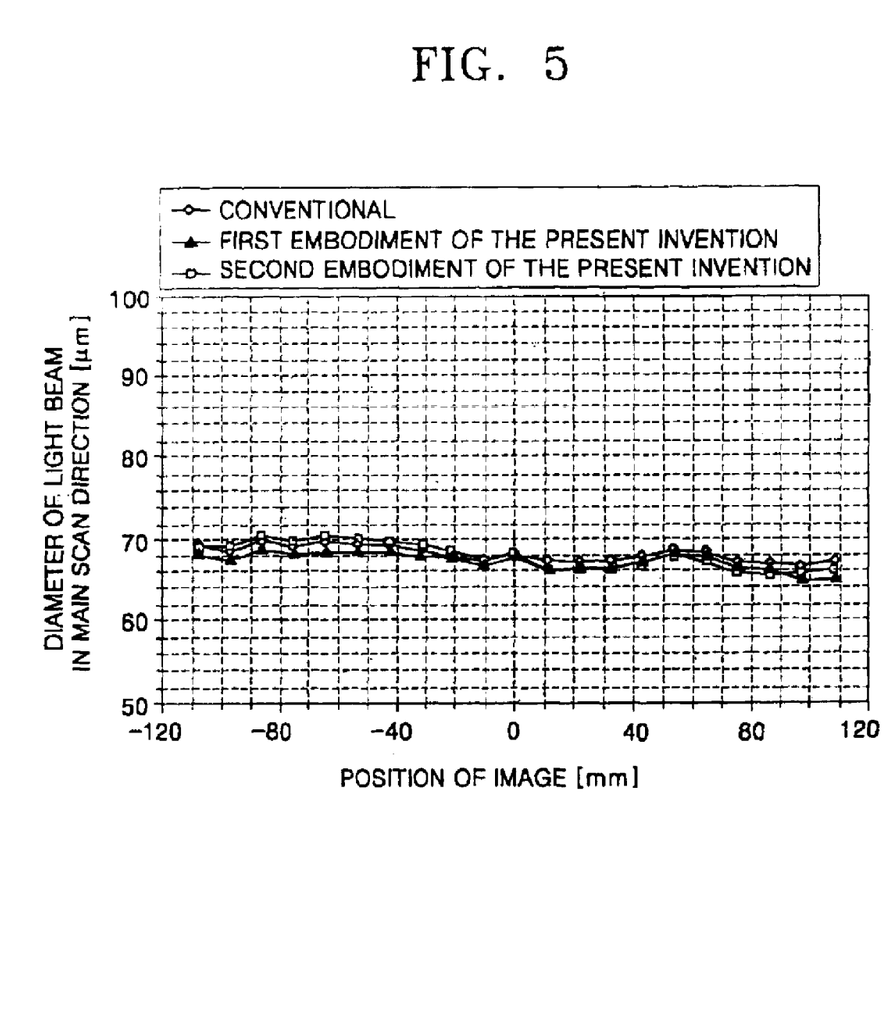
FIG. 5 is a graph showing the diameters of light beams imaged in a main scan direction by the conventional optical scanning apparatus shown in FIG. 1 and the optical scanning apparatuses according to the first and second embodiments of the present invention shown in FIGS. 2 and 4.
Figure 6:
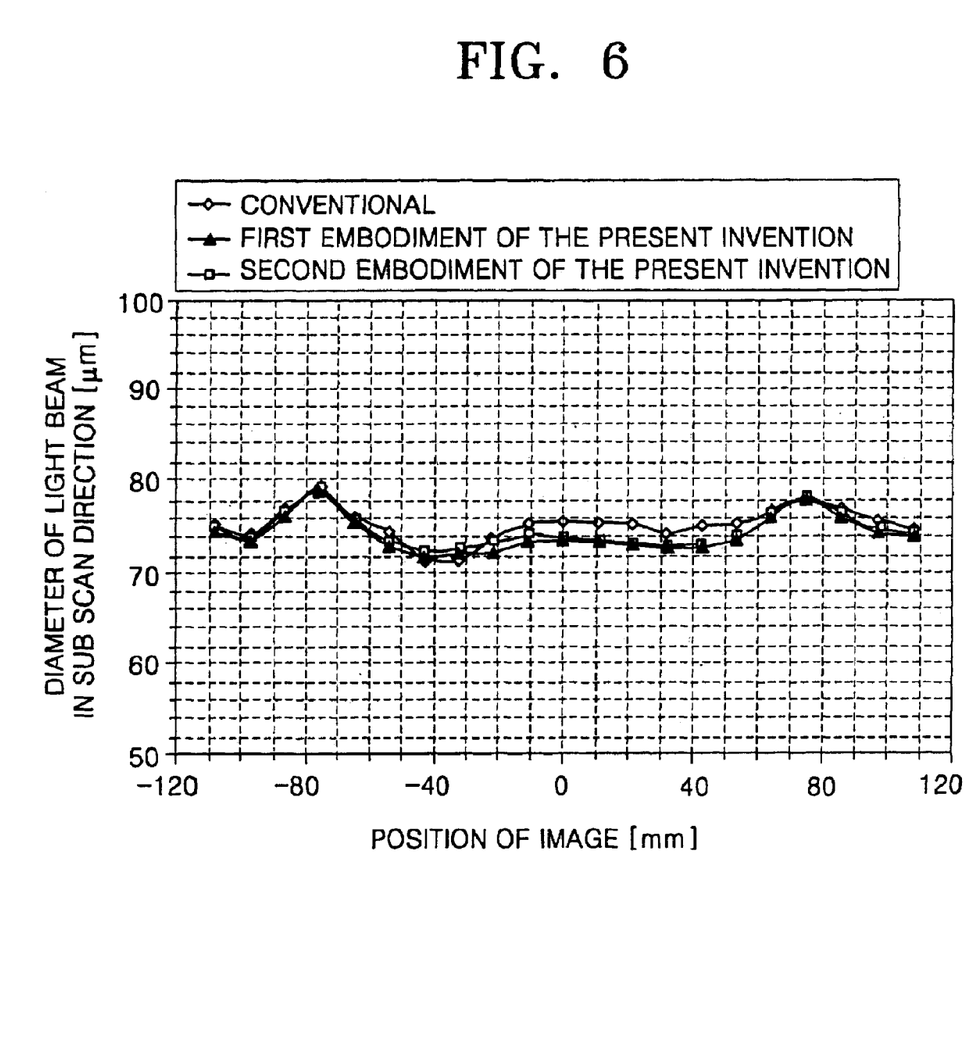
FIG. 6 is a graph showing the diameters of light beams imaged in a sub scan direction by the conventional optical scanning apparatus shown in FIG. 1 and the optical scanning apparatuses according to the first and second embodiments of the present invention shown in FIGS. 2 and 4.

FIG. 5 is a graph showing the diameters of light beams imaged in a main scan direction by the conventional optical scanning apparatus shown in FIG. 1 and the optical scanning apparatuses according to the first and second embodiments of the present invention shown in FIGS. 2 and 4. FIG. 6 is a graph showing the diameters of light beams imaged in a sub scan direction by the conventional optical scanning apparatus shown in FIG. 1 and the optical scanning apparatuses according to the first and second embodiments of the present invention shown in FIGS. 2 and 4. FIGS. 5 and 6 show the graphs of changes in the diameter of a light beam depending on the position of an image when the light beam is incident on the deflection surface 70a of the light deflector 70 at different angles, excluding the influence of temperature.

Considering that an image is printed on A4 paper having a width of about 210 mm in a typical image recording apparatus, the horizontal axis in FIGS. 5 and 6 indicates the position of an image with respect to the center of the paper. The vertical axes in FIGS. 5 and 6 indicate the diameter of a light beam, forming the image on the target surface 10, in the main and sub scan directions, respectively. The diameter of a light beam corresponds to the width of the light beam where the intensity of the light beam is about 13.5% of a maximum value.

As shown in FIGS. 5 and 6, according to an optical scanning apparatus of the present invention, even though the incident angle of a light beam entering the deflection surface 70a of the light deflector 70 greatly changes from 60 degrees to 90 degrees, the diameter of a light beam forming an image is only slightly influenced by the change in the incident angle of the light beam. Accordingly, it is possible to maintain image forming performance even though the incident angle of a light beam changes.

Therefore, it can be inferred from the comparison among the optical scanning apparatuses shown in FIGS. 1, 2, and 4 and the graphs shown in FIGS. 5 and 6 that an optical scanning apparatus of the embodiments of the present invention allows the incident angle of a light beam entering the deflection surface 70a of the light deflector 70 to be changed within a wide range without changing image forming performance, thereby securing the freedom in designing the apparatus and disposing the components.

In addition, since an optical scanning apparatus of the present invention secures design freedom with respect to an incident angle, the effective area of the deflection surface 70a can be decreased. Consequently, the present invention can overcome the problem of performance degradation due to the contamination of the deflection surface 70a during high speed rotation. For example, in a case where a polygon mirror is used as the light deflector 70, when the polygon mirror rotates at a high speed, ambient contaminants also rotate around the polygon mirror and may adhere to the edge of a reflective surface of the polygon mirror, contaminating the edge of the reflective surface. In a case of requiring a wide effective area when a light beam is deflected by the reflective surface, i.e., the deflection surface 70a, even the edge of the reflective surface may be needed as the effective area. In this case, the contaminants adhering to the edge may affect a deflected light beam, thereby degrading performance. However, according to the present invention, the effective area of the deflection surface 70a can be decreased, so that the edge of the reflective surface, i.e., the deflection surface 70a, is not used to deflect a light beam. Consequently, a problem of performance degradation due to contamination does not occur.

Moreover, according to the present invention as shown in FIG. 2, the incident angle of a light beam entering the deflection surface 70a of the light deflector 70 can be sufficiently decreased to reduce a difference in the quantity of light forming an image, which occurs due to a difference in the reflectance of the deflection surface 70a between the center and ends of the image, and the effective area of the deflection surface 70a can be decreased, so that factors causing the degradation of image print quality can be remarkably reduced.

As described above, according to an optical scanning apparatus of the present invention, image print quality is not degraded even though internal temperature increases when at least one of the optical components is made of a plastic material, and the freedom in designing the incident angle of light emitted from a light source and entering a deflection surface of a light deflector can be increased. In other words, when an optical scanning apparatus according to the present invention is used, degradation of performance due to a change in temperature can be prevented, and the freedom can be increased.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical scanning apparatus comprising:
   a light source;
   a light deflector having at least one deflection surface to deflect a light beam emitted from the light source;
   an image forming surface;
   an image forming optical system to form an image on the image forming surface with the light beam deflected by the light deflector; and
   a mirror member between the light source and the light deflector and having different refractivities in a main scan direction and a sub scan direction so that the mirror member reflects the light beam emitted from the light source to form a linear image on the deflection surface in the main scan direction.

2. The optical scanning apparatus of claim 1, wherein the mirror member convergently reflects the light beam emitted from the light source and incident thereon in the sub scan direction.

3. The optical scanning apparatus of claim 2, wherein the mirror member is a cylindrical mirror having a plane in the main scan direction and a spherical or an aspherical surface in the sub scan direction.

4. The optical scanning apparatus of claim 3, wherein an angle of the light beam emitted from the light source and incident on the deflection surface of the light deflector is changed in the main scan direction using the mirror member.

5. The optical scanning apparatus of claim 1, wherein the mirror member is a cylindrical mirror having a plane in the main scan direction and a spherical or an aspherical surface in the sub scan direction.

6. The optical scanning apparatus of claim 5, wherein an angle of the light beam emitted from the light source and incident on the deflection surface of the light deflector is changed in the main scan direction using the mirror member.

7. The optical scanning apparatus of claim 1, wherein an angle of the light beam emitted from the light source and incident on the deflection surface of the light deflector is changed in the main scan direction using the mirror member.

8. The optical scanning apparatus of claim 2, wherein an angle of the light beam emitted from the light source and incident on the deflection surface of the light deflector is changed in the main scan direction using the mirror member.

9. The optical scanning apparatus of claim 1, wherein the light beam is divergently emitted from the light source and the apparatus further comprises a lens between the light source and the mirror member, which condenses the light beam divergently emitted from the light source and converts the light beam into a converging or parallel light beam.

10. The optical scanning apparatus of claim 1, wherein the image forming optical system comprises an f-θ lens, which guides the light beam deflected by the deflection surface of the light deflector with different refractivities in the main and sub scan directions to form the image on the image forming surface.

11. An apparatus comprising:
    a light source to emit a light beam;
    a mirror to reflect the emitted light beam; and
    a deflector to deflect the reflected light beam,
    the mirror being between the light source and the light deflector and having different refractivities in a main scan direction and a sub scan direction so that the reflected light beam forms a linear image on the deflector which is longer in the main scan direction than in the sub scan direction.

12. The apparatus of claim 11, further comprising:
    an image forming surface; and
    a lens between the deflector and the image forming surface, to receive the deflected light beam and form an image on the image forming surface.

13. The apparatus of claim 12, wherein the lens is closer to the deflector than the image forming surface.

14. The apparatus of claim 12, wherein the lens has different refractivities for the deflected light beam in the sub scan and main scan directions.

15. The apparatus of claim 11, wherein the mirror is a cylindrical mirror having a plane in the main scan direction.

16. The apparatus of claim 11, wherein the mirror is a spherical or an aspherical surface with a positive power in the sub scan direction.

17. The apparatus of claim 11, wherein the mirror is not optically influenced by a change in the refractivities and an expansion coefficient of a material thereof when a temperature of the apparatus increases.

18. The apparatus of claim 11, wherein the mirror reflects the light beam in the main scan direction without converging/diverging the light beam, and convergently reflects the light beam in the sub scan direction.

19. The apparatus of claim 11, wherein an incident angle of the reflected light beam entering the deflector is approximately 60 degrees.

20. The apparatus of claim 11 wherein an incident angle of the reflected light beam entering the deflector is approximately 90 degrees.

* * * * *

UNITED STATES PATENT AND TRADEMARK OFFICE
CERTIFICATE OF CORRECTION

PATENT NO. : 6,865,004 B2 Page 1 of 1
DATED : March 8, 2005
INVENTOR(S) : Hyung-soo Kim It is certified that error appears in the above-identified patent and that said Letters Patent is hereby corrected as shown below:

Column 8,
Line 62, after "claim 11" insert -- , --.

Signed and Sealed this

Thirteenth Day of December, 2005

JON W. DUDAS
*Director of the United States Patent and Trademark Office*